(12) United States Patent
Bai et al.

(10) Patent No.: US 9,124,605 B2
(45) Date of Patent: Sep. 1, 2015

(54) TERMINAL, INFORMATION INTER-CUT SYSTEM AND METHOD

(75) Inventors: Tian Bai, Shenzhen (CN); Yuanqing Shi, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 883 days.

(21) Appl. No.: 13/142,660

(22) PCT Filed: Dec. 7, 2009

(86) PCT No.: PCT/CN2009/075375
§ 371 (c)(1),
(2), (4) Date: Jun. 29, 2011

(87) PCT Pub. No.: WO2010/075725
PCT Pub. Date: Jul. 8, 2010

(65) Prior Publication Data
US 2011/0271003 A1    Nov. 3, 2011

(30) Foreign Application Priority Data
Dec. 30, 2008    (CN) .......................... 2008 1 0241912

(51) Int. Cl.
*G06F 15/16*    (2006.01)
*H04L 29/06*    (2006.01)

(52) U.S. Cl.
CPC ........ *H04L 65/1083* (2013.01); *H04L 65/4015* (2013.01)

(58) Field of Classification Search
CPC . H04L 65/00; H04L 65/608; H04L 29/06027; H04L 65/4007; H04L 65/4015; H04L 65/1086; G06Q 30/241
USPC ........ 709/226–232; 725/26–36; 715/230–242
See application file for complete search history.

(56) References Cited

U.S. PATENT DOCUMENTS

| | | | |
|---|---|---|---|
| 6,771,644 B1 * | 8/2004 | Brassil et al. .................. | 370/390 |
| 7,664,516 B2 * | 2/2010 | Levi et al. ...................... | 455/466 |

(Continued)

FOREIGN PATENT DOCUMENTS

| | | |
|---|---|---|
| CN | 101111077 A | 1/2008 |
| CN | 101212443 A | 7/2008 |
| CN | 101309393 A | 11/2008 |
| CN | 101453474 A | 6/2009 |
| WO | WO 2008/052972 A1 | 5/2008 |

OTHER PUBLICATIONS

International Search Report for International Application No. PCT/CN2009/075375, mailed Feb. 25, 2010.

(Continued)

*Primary Examiner* — John MacIlwinen
(74) *Attorney, Agent, or Firm* — Clark & Elbing LLP

(57) ABSTRACT

The present invention relates to a terminal, an information inter-cut system and method. In the method, after the terminal receives an information play request signaling sent by an information server, if the terminal itself is performing video share, the terminal will send a video share pause signaling to the other terminal of video share, and will send a request accept signaling to the information server after receiving the response signaling of the other terminal; the information server transmits to the terminal the information data to be played; the terminal plays the received information, and sends a video share restoration signaling to the other terminal to restore the paused video share after the information play is over. The present invention can receive any form of information issued by an operator, without influencing the user performing video share service.

14 Claims, 3 Drawing Sheets

(56) References Cited

U.S. PATENT DOCUMENTS

| | | | |
|---|---|---|---|
| 7,716,572 B2* | 5/2010 | Beauregard et al. | 715/223 |
| 8,230,073 B1* | 7/2012 | Leeder et al. | 709/227 |
| 8,611,428 B1* | 12/2013 | Huang et al. | 375/240.26 |
| 2007/0204310 A1* | 8/2007 | Hua et al. | 725/88 |
| 2008/0109878 A1 | 5/2008 | Delegue et al. | |
| 2008/0209066 A1* | 8/2008 | Spio et al. | 709/231 |
| 2008/0250466 A1* | 10/2008 | Ke | 725/109 |
| 2009/0201835 A1* | 8/2009 | Balakrishnan et al. | 370/261 |

OTHER PUBLICATIONS

Written Opinion for International Application No. PCT/CN2009/075375, mailed Feb. 25, 2010.

International Preliminary Report on Patentability for International Application No. PCT/CN2009/075375, issued Jul. 5, 2011.

* cited by examiner

TERMINAL, INFORMATION INTER-CUT SYSTEM AND METHOD

CROSS-REFERENCE TO RELATED APPLICATIONS

This application is the U.S. National Stage filing under 35 U.S.C. §371 of International Application No. PCT/CN2009/075375, filed Dec. 7, 2009, which claims benefit of Chinese Patent Application No. 200810241912.2, filed Dec. 30, 2008.

FIELD OF THE INVENTION

The present invention relates to the technical field of playing the real time streaming media based on IMS domain, in particular to a terminal, an information inter-cut system and method.

BACKGROUND OF THE INVENTION

On the basis of packet bearer network, the third generation partnership project (3GPP for short) introduces an IP multimedia subsystem (IMS for short) core network of all-internet protocol (IP for short) service network architecture, which aims to shield the user access mode, control the opening degree of service ability, and provide multimedia communication experience according to individualized user data. Video share service means that one user terminal shares local video information with the other user terminals in a point-to-point way, wherein the video information shared by the user terminals comprises the video shot by a camera and local video documents.

The message transmitted in the video share service can be divided into two categories, the signaling and the media data. The signaling and the media data both adopt IP packet transmission mode, but generally select different transmission protocols, wherein the signaling control is based on session initiation protocol (SIP for short), and a calling user terminal and a called user terminal need to register in the IMS core network before performing the video share. The transmission protocol of the media is a real-time transport protocol (RTP for short) and a RTP control protocol (RTCP for short). The RTP is responsible for bearing practical media load, and the RTCP is used to transmit the information such as quantity of packages transmitted, time delay and jitter between both of the transmitting parties, i.e., between the server and the terminal.

The video share service brings huge business opportunity for network operators. A patent of invention with the application number of CN200710000231.2 and titled as "*An Method and Device of Inserting Advertisement*" put forwards a method of a media server to inter-cut advertisement related to video content while transmitting the video. In the method, the terminal must passively receive the advertisement transmitted by the server, rather than subscribe the information by a manner of activating the service, and this patent merely can achieve inter-cutting video advertisement.

SUMMARY OF THE PRESENT INVENTION

The present invention provides a terminal, an information inter-cut system and method. The present invention can receive any form of information issued by the operator, such as text, picture, voice and video, and at the same time does not influence the user performing video share service.

The information inter-cut method provided by the present invention comprises the steps as follows:

Step 1, judging whether a terminal itself is performing video share or not, after the terminal receives an information play request signaling sent by a information server, in which if yes, step 2 is executed; otherwise, the terminal sends a request rejection signaling to the information server, and the information inter-cut of this time ends;

Step 2, sending by the terminal a video share pause signaling to the other terminal of the video share, and sending by the terminal a request acceptance signaling to the information server after receiving a response signaling of the other terminal; and Step 3, transmitting by the information server the information data to be played to the terminal; playing by the terminal the received information data, and sending a video share restoration signaling to the other terminal to restore the paused video share after playing the information data is finished.

Before step 1, the method also comprises:

Step A, sending by the terminal a register request signaling to a signaling server to request to register in the signaling server;

Step B, forwarding by the signaling server the register request signaling to the information server after receiving the register request signaling, judging by the information server whether the terminal has activated information inter-cut service or not wherein if yes, it records register information of the terminal and returns a information server register success signaling to the signaling server; otherwise, it returns a information server register failure signaling to the signaling server;

Step C, returning a signaling server register success signaling to the terminal after the signaling server receives the signaling returned by the information server; and Step D, sending by the signaling server an information play request signaling to the registered terminal.

The register request signaling carries the IP address of the terminal which requests to register; and the information server judges whether the terminal has activated the information inter-cut service or not according to the IP address.

Between step 1 and step 2, the method also comprises the steps as follows:

performing media negotiation between the terminal and the information server, wherein if the negotiation succeeds, step 2 is executed; otherwise, the information inter-cut of this time ends.

In step 2, if the terminal does not receive the response signaling from the other terminal within a set period of time, the terminal sends a request rejection signaling to the information server, and the information inter-cut of this time ends.

Between step 2 and step 3, the method also comprises the steps as follows:

establishing an information media transmission link between the information server and the terminal.

In step 3, if playing the information data is finished, the information server sends an information data play end signaling to the terminal; and after receiving the information data play end signaling, the terminal sends a video share restoration signaling to the other terminal.

Further, in step 3, while playing the information data, the terminal also monitors whether the paused video share is terminated or not, wherein if yes, it sends an information data play end signaling to the information server, and the information inter-cut of this time ends.

The present invention also provides an information inter-cut system which comprises a terminal, an information server, a signaling server and a media server.

the terminal configured to pause ongoing video share when an information play request signaling is received, to receive and play information data transmitted by the information server, and to restore the paused video share when an information data play end signaling is received;

the information server configured to send an information play request signaling to a terminal which has activated the information inter-cut service and registered, to transmit the information data to be played to the terminal after the terminal accepts the request, and to send an information play end signaling to the terminal when the transmission of the information data is finished; and the signaling server configured to forward the received register request signaling to the information server, to send a signaling server register success information to the terminal which requests to register after the information server returns a signaling, and to transfer a signaling among the terminals.

The information server comprises a control module, a subscription information module and an information resource module, wherein, the control module configured to judge whether the terminal has activated the information inter-cut service or not, to write into the subscription information module the register information of the terminal which has activated the information inter-cut service, and to send an information play request signaling to the registered terminal;

the subscription information module configured to store the information of the terminal which succeeds in registering in the information server; and the information resource module configured to store the information data and transmit the information data to the terminal.

The control module comprises a signaling module, a judgment module and a writing module, the signaling module configured to perform signaling interaction with a terminal and the signaling server;

the judging module configured to judge whether the terminal which sends the register request signaling has activated the information inter-cut service or not, and to send to the writing module the register information of the terminal which has activated the information inter-cut service; and the writing module configured to write the received information into the subscription information module.

The terminal is also used for performing media negotiation with the information server.

The present invention further provides a terminal which is used in the information inter-cut system and comprises a signaling control module, a media transmission module and a media play module, wherein, the signaling control module is used for judging whether accept the information inter-cut or not, performing media negotiation, notifying the media transmission module to pause or restore the transmission of the video share data, notifying the media transmission module to receive the information data, notifying the media play module to play the information data received by the media transmission module, and terminating the ongoing information inter-cut or paused video share;

the media transmission module is used for pausing or restoring the transmission of the video share data, and receiving the information data; and the media play module is used for playing the information data received by the media transmission module.

The present invention can ensure the terminal to receive the information sent by the operator at any time during video share service. The form of the information can be text, picture, voice and video. The present invention ensures that the operator can use the terminal to inter-cut information during video share, broadcast commercial advertisement on the terminal to gain commercial profit, and can expand the function of the video share service, such as playing short film and news etc. for both video shared terminals during video share.

DETAILED DESCRIPTION

The present invention will be detailed hereinafter in connection with the embodiments and drawings.

Figure 1:
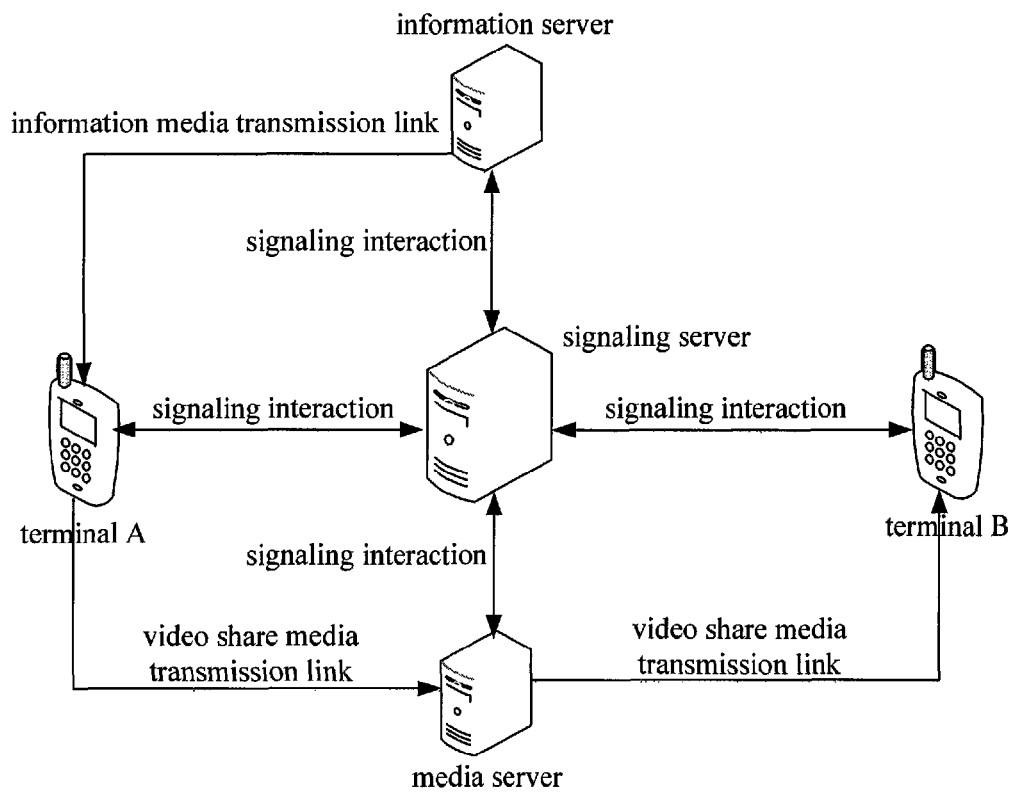
FIG. 1 is a principle block diagram of the system according to the embodiment of the present invention.

As shown in FIG. 1 which is a principle block diagram of the system according to the embodiment of the present invention, the system comprises a terminal, an information server, a signaling server and a media server. The whole system is divided into two independent layers: a signaling control layer and a media transmission layer. The signaling control layer adopts SIP (SIP RFC3261) protocol, and the media transmission layer adopts RTP (RFC3550) protocol. A session description protocol (SDP for short) (RFC3264) is adopted between the signaling control layer and the media transmission layer.

In the above, the terminal is configured such that when receiving an information play request, the terminal sends, according to the service type that the terminal per se is performing, a video share pause signaling to the terminal of the other party of the video share via the signaling server, or directly sends an information play request rejection signaling to the information server; used for receiving and playing the information data transmitted by the information server; used for sending a video share restoration signaling to the terminal of the other party of the video share to restore the paused video share when receiving an information data play end signaling, or for returning a response signaling to the other terminal after receiving the video share pause signaling; and used for performing media negotiation with the information server.

Figure 2:
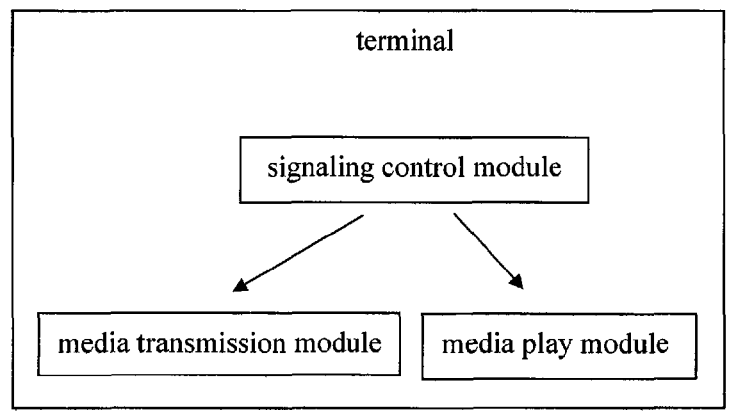
FIG. 2 is a structural block diagram of the terminal according to the embodiment of the present invention.

As shown in FIG. 2 which is a structural block diagram of the terminal according to the embodiment of the present invention, the terminal comprises a signaling control module, a media transmission module and a media play module, in which the signaling control module is used for judging whether to accept the information inter-cut or not; is used for performing media negotiation; is used for notifying the media transmission module to pause or restore the transmission of the video share data; is used for notifying the media transmission module to receive the information data; is used for notifying the media play module to play the information data received by the media transmission module; and is used for terminating the ongoing information inter-cut or paused video share;

the media transmission module is used for pausing or restoring the transmission of the video share data, and receiving the information data; and the media play module is used for playing the information data received by the media transmission module.

The information server is used for sending an information play request to the terminal which has activated the information inter-cut service and registered, transmitting the information data to be played to the terminal after the terminal accepts the request, and sending an information data play end signaling to the terminal when the transmission of the information data is over.

Figure 3:
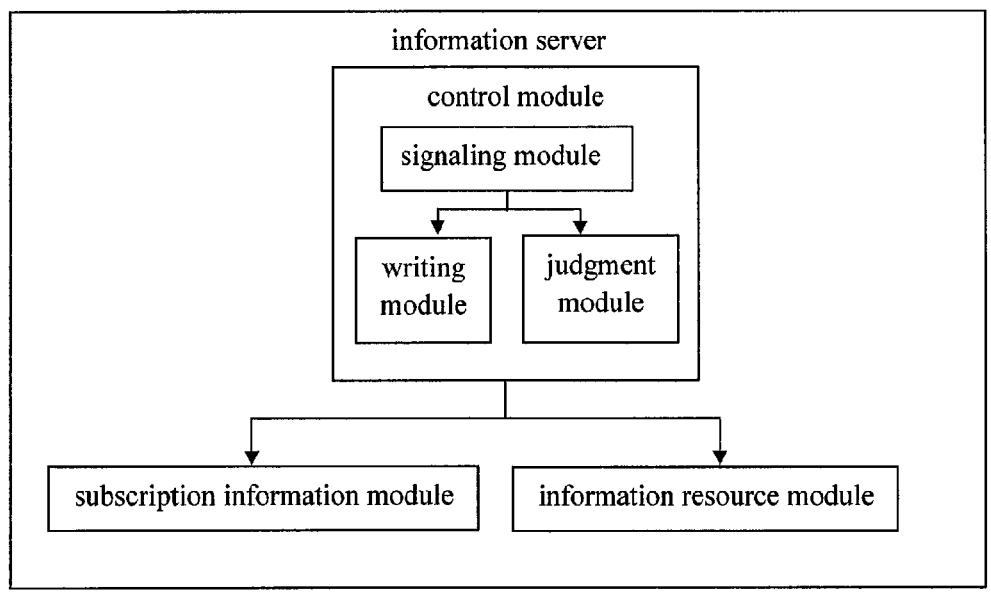
FIG. 3 is a structural block diagram of the information server according to the embodiment of the present invention.

As shown in FIG. 3 which is a structural block diagram of the information server according to the embodiment of the present invention, the information server comprises a control module, a subscription information module and an information resource module.

The control module is used for judging whether the terminal which sends a register request signaling has activated the information inter-cut service or not when the register request signaling is received; is used for writing into the subscription information module the register success information of the terminal which has activated the information inter-cut service; is used for returning the signaling of whether the terminal succeeds to log in the present server or not to the signaling server; and is used for regularly or randomly sending the information play request signaling to the terminal which has registered successfully. The control module specifically comprises a signaling module, a judgment module and a writing module, wherein the signaling module is used for performing signaling interaction with the terminal and the signaling server, including receiving the register request signaling forwarded by the signaling server, returning the signaling of whether the terminal succeeds to register in the present server or not to the signaling server, sending the information play request signaling to the registered terminal and performing media negotiation with the terminal; the judgment module is used for judging whether the terminal which sends the register request signaling has activated the information inter-cut service or not, and sending the register information of the terminal which has activated the information inter-cut service to the writing module; the writing module is used for writing the received information into the subscription information module.

The subscription information module is used for storing the information of the terminal which succeeds in registering in the information server.

The information resource module is used for storing the information data and transmitting the information data to the terminal, namely storing the information data to be inter-cut and transmitting the data to the terminal after the media transmission link is established.

The signaling server is used for forwarding the received register request signaling to the information server, sending signaling server register success information to the terminal which requests to register, after the information server returns a signaling, and for transferring signaling among the terminals.

The information server is used for sending the information play request signaling regularly and randomly to the terminal which has activated the information inter-cut service and registered, transmitting the information data to be played to the terminal after the terminal accepts the request, and sending an information play end signaling to the terminal when the transmission of the information data is over.

The link between the information server and the terminal is an information media transmission link, and the link between the media server and the terminal is a video share media transmission link. The information and video share data are transmitted on different links. The interaction among the terminals or among the servers is transmitted through the signaling link. That is to say, each of the signaling and the data has its own transmission path. The signaling interaction and media data transmission of the present system are performed in different layers, and thus the signaling interaction does not influence the transmission of the media data.

Figure 4:
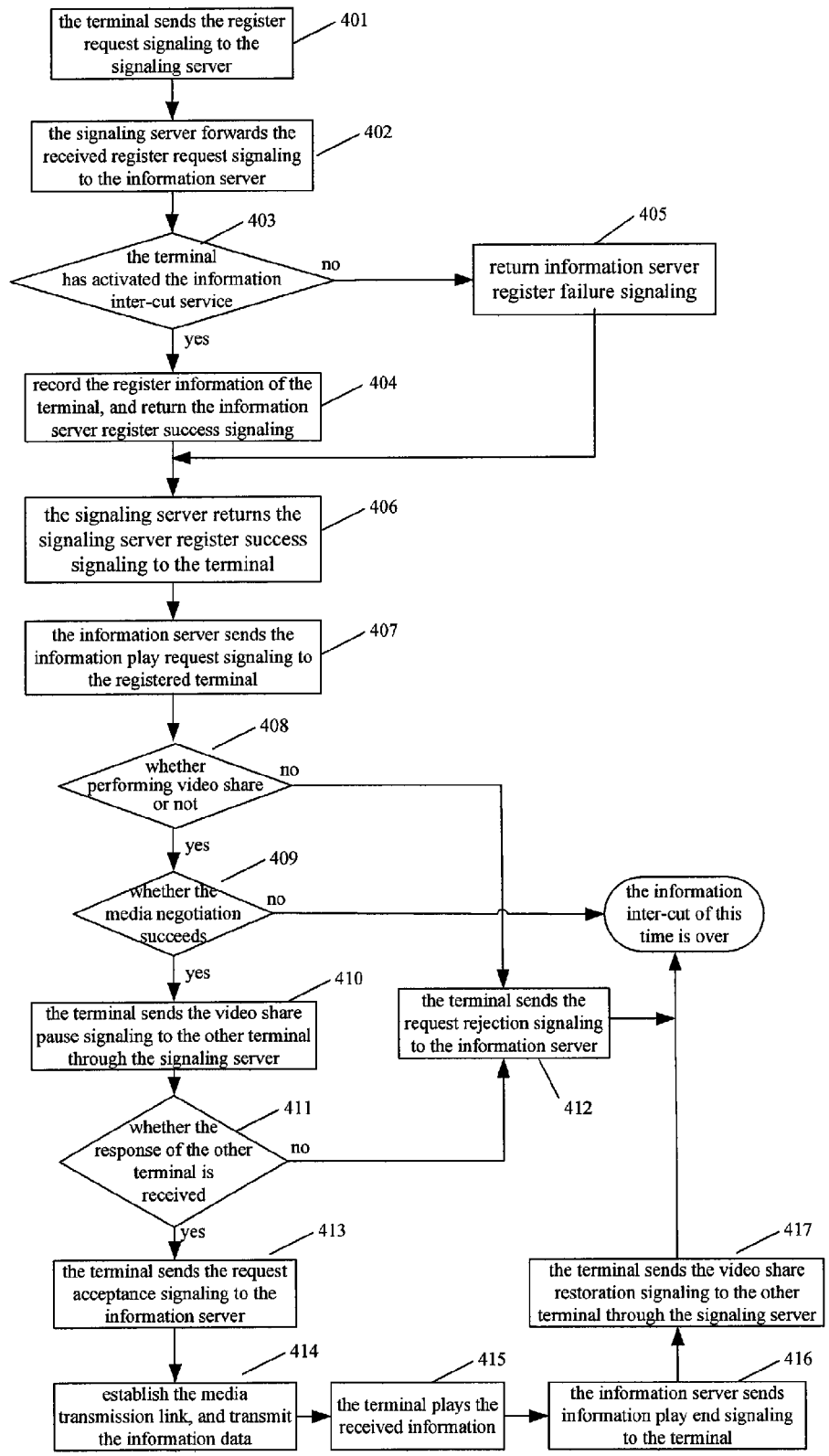
FIG. 4 is a flowchart of the method according to the embodiment of the present invention.

As shown in FIG. 4 which is a flowchart of the method according to the embodiment of the present invention, in connection with FIG. 1, the method comprises the steps as follows.

Step 401, the terminal sends a register request signaling to the signaling server to request to register in the signaling server; and the register request signaling carries the IP address of the terminal.

As shown in FIG. 1, in the present embodiment, terminal A and terminal B need to establish a session, supposing that terminal A has activated the information inter-cut service, and terminal B has not activated the information inter-cut service.

Step 402, the signaling server forwards the register request signaling to the information server after receiving the register request signaling.

Step 403, the information server judges whether the terminal has activated the information inter-cut service or not, wherein if yes, it executes Step 404; otherwise, it executes Step 405

The step 403 is concretely completed by the control module of the information server. That is to say, the control module judges whether the terminal which sends the register request signaling has activated the information inter-cut service or not when the control module receives the register request signaling.

Step 404, the information server records the register information of the terminal, and returns an information server register success signaling to the signaling server; and step 406 is to be executed.

The step 404 is also completed by the control module of the information server. That is to say, the control module writes the register information of the terminal into the subscription information module of the information server, and then returns the information server register success signaling to the signaling server.

Step 405, the information server register failure signaling is returned to the signaling server.

The step 405 is completed by the control module of the information server. That is to say, the control module returns information server register failure signaling to the signaling server.

In the present embodiment, for the terminal A, the information server writes the register information thereof into the subscription information module at first, and returns to the signaling server 200 OK message indicating the terminal A has activated the information inter-cut service; and for the terminal B, the information server only returns to the signaling server the message in the step 404 indicating the terminal B has not activated the information inter-cut service.

Step 406, the signaling server returns the register success signaling to the terminal after receiving the signaling returned by the information server.

That is to say, no matter whether the terminal A and terminal B activate the information inter-cut service or not, the signaling server will make the registration and return the register success signaling. In this case, the session is established between the terminal A and terminal B.

Step 407, the information server sends the information play request signaling to the registered terminal regularly, to request to inter-cut information.

In the embodiment, the control module of the information server polls the information stored in the subscription information module, and sends the information play request signaling regularly to the terminal A. In the other embodiments, if both terminals of the video share have activated the information inter-cut service, the information server can send the information play request signaling to the both terminals regularly or at any moment.

Step 408, after receiving the information play request signaling, the terminal judges whether the terminal itself is performing video share or not, wherein if yes, step 409 is to be executed; otherwise, step 412 is to be executed.

Step 409, the terminal performs media negotiation with the information server, wherein if the negotiation succeeds, step 310 is executed; otherwise, the information inter-cut of this time is over.

Step 410, the terminal sends the video share pause signaling to the terminal of the other party of video share via the signaling server, and waits for the response signaling of the other party;

That is to say, after the terminal A agrees to inter-cut information, the terminal sends the video share pause signaling to the signaling server, and the signaling server forwards the signaling to the terminal B.

Step 411, the terminal judges whether the response signaling of the other terminal is received within a set period of time or not, wherein if yes, step 413 is executed; otherwise, step 412 is executed.

Step 412, the terminal sends a request rejection signaling to the information server, and the information inter-cut of this time is over.

Step 413, the terminal sends a request acceptance signaling to the information server.

Step 414, the information server establishes the information media transmission link with the terminal, and transmits the information data to be played to the terminal after the establishment succeeds.

After the media negotiation between the information server and the terminal succeeds so as to establish the information media transmission link, the control module of the information server notifies the information resource module of the information server, to take the responsibility for performing information transmission with the terminal A.

Step 415, the terminal plays the received information.

Step 416, after the transmission of the information data is over, the information server sends an information play end signaling to the terminal.

That is to say, the control module of the information server sends the information play end signaling to the terminal A.

Step 417, after receiving the information play end signaling, the terminal sends a video share restoration signaling to the other terminal via the signaling server to restore the paused video share.

That is to say, after receiving the information play end signaling, the terminal A sends the video share restoration signaling to signaling server; the signaling server forwards the signaling to the terminal B; and the terminal A and the terminal B restore the video share.

In the present invention, if any party of terminal A and terminal B ends the paused video share during information inter-cut, a signaling for ending the video share will be required to be sent to the other terminal via the signaling server. After receiving the signaling, the other terminal will send an information play termination signaling to the information server to request to terminate the information inter-cut. Otherwise, the terminal will not send the request of terminating information inter-cut to the information server.

The internal work flow of the terminal is detailed hereafter in connection with FIG. 2.

When receiving the information play request sent by the information server, the signaling control module of the terminal judges whether the terminal itself is performing video share or not at first. If the terminal is not performing video share, the signaling control module will send the request rejection signaling to the information server and reject the information inter-cut. If the terminal is performing video share, the signaling control module will perform media negotiation with the information server, and send the video share pause signaling to the other terminal of the video share after the negotiation succeeds. After receiving the response signaling of the other terminal, the signaling control module notifies the media transmission module to pause the transmission of the video share data. Afterward, the signaling control module sends the request acceptance signaling to the information server, notifies the information server to start to transmit the information data to be inter-cut, and at the same time notifies the media transmission module to receive the information data and notifies the media play module to play the information data received by the media transmission module. The media transmission module receives the data sent from the information server, and the media play module plays the information data received by the media transmission module. Thus far, information inter-cut starts formally. During information inter-cut, if the signaling control module receives the information play end signaling sent by the information server, the signaling control module will send the video share restoration signaling to the other terminal, and notify the media transmission module to restore the transmission of the video share data after receiving the response signaling of the other terminal; and if the signaling control module receives the video share termination signaling sent by the other terminal through the signaling server, the signaling control module will send the information play termination signaling to the information server to request to terminate the information inter-cut.

The detailed descriptions above are only preferable embodiments of the present invention, which can not be regarded as restriction to the present invention. Any embodiments which are similar to the principle disclosed by the present invention are all included in the protection scope of the present invention. The protection scope of the present invention shall be defined by the attached claims.

What is claimed is:

1. An information inter-cut method, comprising the following steps:

Step 1, judging whether a terminal itself is performing video share or not, after the terminal receives an information play request signaling sent by a information server, in which if yes, step 2 is executed; otherwise, the terminal sends a request rejection signaling to the information server, and the information inter-cut of this time ends;

Step 2, sending by the terminal a video share pause signaling to the other terminal of the video share, and sending by the terminal a request acceptance signaling to the information server after receiving a response signaling of the other terminal; and Step 3, transmitting by the information server the information data to be played to the terminal; playing by the terminal the received information data, and sending a video share restoration signaling to the other terminal to restore the paused video share after playing the information data is finished.

2. The information inter-cut method according to claim 1, wherein before the step 1, the method also comprises:

Step A, sending by the terminal a register request signaling to a signaling server to request to register in the signaling server;

Step B, forwarding by the signaling server the register request signaling to the information server after receiving the register request signaling, judging by the information server whether the terminal has activated information inter-cut service or not wherein if yes, it records register information of the terminal and returns a information server register success signaling to the signaling server; otherwise, it returns a information server register failure signaling to the signaling server;

Step C, returning a signaling server register success signaling to the terminal after the signaling server receives the signaling returned by the information server; and Step D, sending by the signaling server an information play request signaling to the registered terminal.

3. The information inter-cut method according to claim 2, wherein the register request signaling carries the IP address of the terminal which requests to register; and the information server judges whether the terminal has activated the information inter-cut service or not according to the IP address.

4. The information inter-cut method according to claim 1, wherein between step 1 and step 2, the method also comprises the following steps:
performing media negotiation between the terminal and the information server, wherein if the negotiation succeeds, step 2 is executed; otherwise, the information inter-cut of this time ends.

5. The information inter-cut method according to claim 4, wherein between the step 2 and the step 3, the method also comprises the following steps:
establishing an information media transmission link between the information server and the terminal.

6. The information inter-cut method according to claim 1, wherein in the step 2, if the terminal does not receive the response signaling from the other terminal within a set period of time, the terminal sends a request rejection signaling to the information server, and the information inter-cut of this time ends.

7. The information inter-cut method according to claim 1, wherein between the step 2 and the step 3, the method also comprises the following steps:
establishing an information media transmission link between the information server and the terminal.

8. The information inter-cut method according to claim 1, wherein in the step 3, if playing the information data is finished, the information server sends an information data play end signaling to the terminal; and after receiving the information data play end signaling, the terminal sends a video share restoration signaling to the other terminal.

9. The information inter-cut method according to claim 1, wherein in step 3, while playing the information data, the terminal also monitors whether the paused video share is terminated or not, wherein if yes, it sends an information data play end signaling to the information server, and the information inter-cut of this time ends.

10. An information inter-cut system, comprising a terminal, an information server, a signaling server and a media server,
the terminal configured to pause ongoing video share when an information play request signaling is received, to receive and play information data transmitted by the information server, and to restore the paused video share when an information data play end signaling is received;
the information server configured to send an information play request signaling to a terminal which has activated the information inter-cut service and registered, to transmit the information data to be played to the terminal after the terminal accepts the request, and to send an information play end signaling to the terminal when the transmission of the information data is finished; and
the signaling server configured to forward the received register request signaling to the information server, to send a signaling server register success information to the terminal which requests to register after the information server returns a signaling, and to transfer a signaling among the terminals.

11. The information inter-cut system according to claim 10, wherein the information server comprises a control module, a subscription information module and an information resource module,
the control module configured to judge whether the terminal has activated the information inter-cut service or not, to write into the subscription information module the register information of the terminal which has activated the information inter-cut service, and to send an information play request signaling to the registered terminal;
the subscription information module is configured to store the information of the terminal which succeeds in registering in the information server; and
the information resource module is configured to store the information data and transmit the information data to the terminal,
wherein the control module, the subscription information module, and the information resource module are stored on memory.

12. The information inter-cut system according to claim 11, wherein the control module comprises a signaling module, a judging module and a writing module,
the signaling module configured to perform signaling interaction with a terminal and the signaling server;
the judging module is configured to judge whether the terminal which sends the register request signaling has activated the information inter-cut service or not, and to send to the writing module the register information of the terminal which has activated the information inter-cut service; and
the writing module is configured to write the received information into the subscription information module, wherein the signaling module, the judging module, and the writing module are stored on memory.

13. The information inter-cut system according to claim 10, wherein the terminal is also configured to perform media negotiation with the information server.

14. A terminal used in an information inter-cut system, comprising a signaling control module, a media transmission module and a media play module,
the signaling control module configured to judge whether the information inter-cut is accepted or not, to perform media negotiation, to notify the media transmission module to pause or restore the transmission of the video share data, to notify the media transmission module to receive the information data, to notify the media play module to play the information data received by the media transmission module, and to terminate the ongoing information inter-cut or paused video share;
the media transmission module is configured to pause or restore the transmission of the video share data, and to receive the information data; and
the media play module is configured to play the information data received by the media transmission module, wherein the signaling control module, the media transmission module, and the media play module are stored on memory.

\* \* \* \* \*